Aug. 11, 1953
S. EPSTEIN
2,648,326
WRAP-AROUND VENT SPACER
Filed Dec. 4, 1950
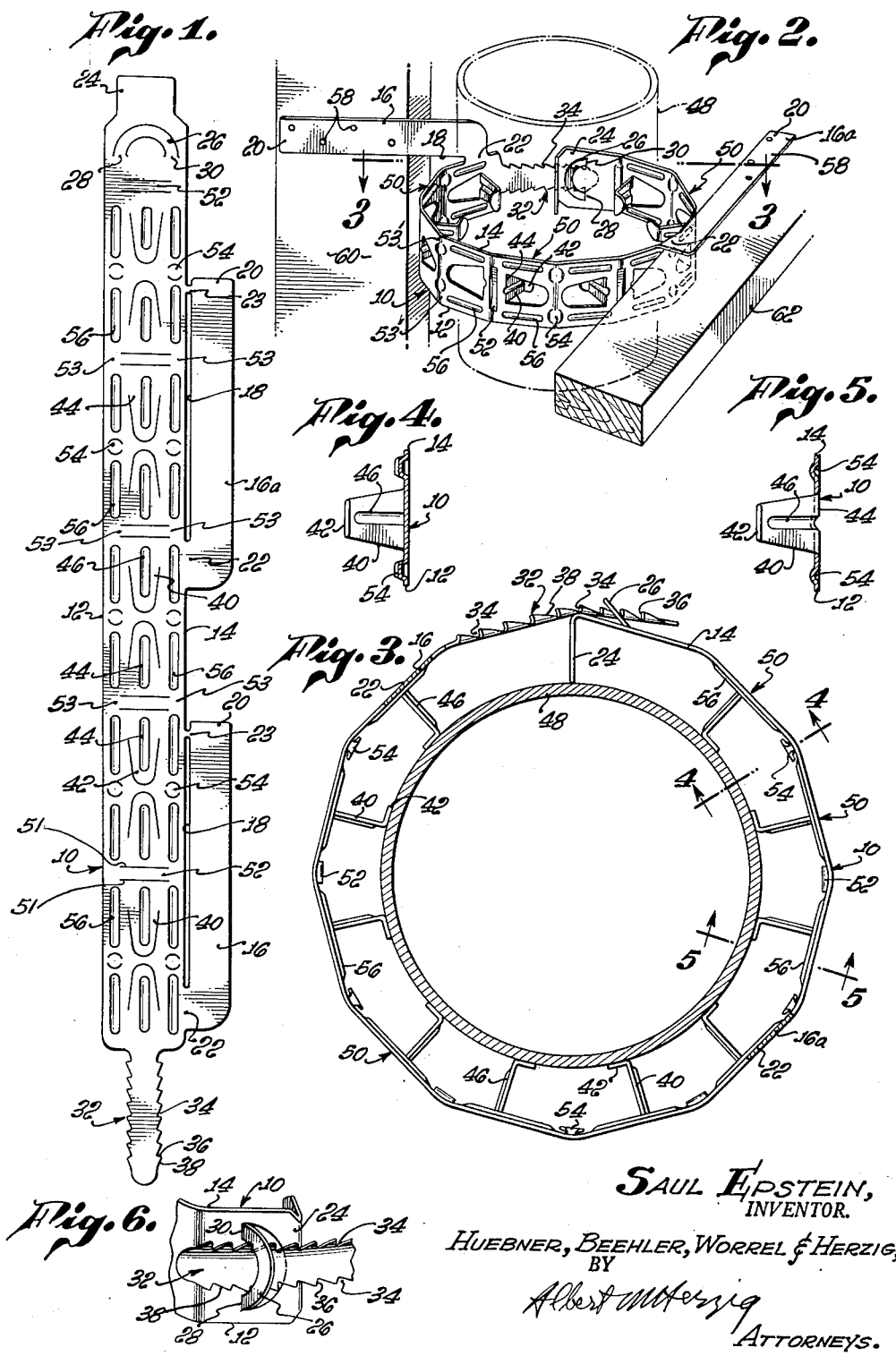
SAUL EPSTEIN, INVENTOR.
HUEBNER, BEEHLER, WORREL & HERZIG,
BY
Albert M Herzig
ATTORNEYS.

Patented Aug. 11, 1953

2,648,326

UNITED STATES PATENT OFFICE 2,648,326

WRAP-AROUND VENT SPACER

Saul Epstein, Los Angeles, Calif.

Application December 4, 1950, Serial No. 199,026

12 Claims. (Cl. 126—317)

This invention relates to a wrap-around vent spacer. Such spacers are particularly useful for example in locating and centering a combustion flue in passing through a ceiling opening or traversing a wall.

It is an object of the invention to provide a new and improved vent spacer particularly useful in mounting around heat appliance conduits such as hot air and water pipes, so as to hold them apart from more combustible material when passing through walls and the like, as usually required by law.

Another purpose resides in the provision of such a one-piece vent spacer which can be readily stamped out of sheet metal and stored or transported in its flat form. Such spacers can be made in varied sizes to accommodate large variations in pipe about which they are adapted to be wrapped and are individually adjustable for smaller variations in conduit size.

A further object is to provide such a wrap-around spacer having adjustable locking means for holding the two ends together; such means are here typified by a ratchet tongue and outturned eyelet formed adjacent opposite ends of the present one-piece stamping.

Yet another purpose resides in the provision of such a spacer having a series of pipe-abutment members bendable transversely out from the body of the strip when ready for use, so as to uniformly space the strip apart from a pipe about which it is wound. A particular feature of such members resides in their arrangement of alternate members being bent in opposite directions from the strip, whereby longitudinal movement of the strip in either direction about the pipe will not collapse them since movement in each direction will be opposed by one set of abutment members or the other.

Still another object of the invention is to provide such a wrap-around spacer having means for converting the strip into successive angularly disposed segments upon bending; such strips or segments may also be provided with reinforcing ribs formed therein upon stamping.

A still further purpose resides in the provision of such a spacer of great adjustability not only in regard to fitting a pipe but which carry means for attachment to structural members such as joists or studding disposed in any possible angular position relative to the pipe.

Yet another object is to provide such a new and improved spacer which is easily bendable to conform to a pipe or the like of different sizes and which can be quickly installed without preforming for an individual installation and even after the pipe is already located in a wall. Thus, after my spacer is wrapped around a pipe and the ends locked together, it can be slid longitudinally along the pipe to locate it within a wall-opening for attachment to studding.

In this connection, it should be noted that the flexibility of my spacers is related in large part to the fact that they are not intended primarily to support or carry the weight of a pipe to which they are attached, although this function may be served if desired, but their function is primarily rather to space or center and hold the same in relation to a wall opening through which it passes. At the same time, when mounted, they are fairly rigid, due at least in part to their segmented nature and reinforcing ribs. The spacer, by means of an integral attachment tab—also formed in stamping—is permanently affixed to a structural member adjacent the wall opening generally after the ends of the spacer have been coupled together about the conduit.

Still another advantage of my spacer, although not its primary purpose, is that it can, if desired, be removed from one pipe and reused on another one of different size or disposition.

It is within the province of the disclosure to improve generally, and to enhance the utility of devices of that type to which the invention appertains.

With the above and other objects in view, which will appear as the description proceeds, the invention resides in the combination and arrangement of parts and in the details of construction and operation hereinafter described and claimed, it being understood that changes in the precise embodiment of the invention herein disclosed, may be made within the scope of what is claimed, without departing from the spirit of the invention.

In the drawings, which form part of the present specification:

Figure 1 is a plan view of one of my vent spacers shown flat as stamped out of sheet metal before bending.

Figure 2 is a perspective view of one of the rolled spacers shown connected to an upright support from which it spaces a conduit indicated in broken lines.

Figure 3 is a top plan view of the spacer of Figure 2 seen along the line 3—3 as viewed in the direction of the arrows.

Figure 4 is a transverse sectional view taken along the line 4—4 of Figure 3 and particularly showing one of the lateral extensions in elevation.

Figure 5 is a view similar to Figure 4 but taken along another section 5—5 of the spacer and showing a lateral extension and side reinforcing ribs.

Figure 6 is a detail view in perspective showing the interconnection of the terminal ratchet locking tongue with an eyelet formed adjacent the opposite end of the spacer.

As seen particularly in Figure 1 my spacer when first formed or stamped out of sheet material consists of an elongated strip 10, approximately rectangular, with one straight side 12 and the opposite longitudinal side 14 having a pair of elongated attachment tabs 16 and 16a disposed generally parallel to the strip and separated therefrom by a narrow slit 18 which extends from the free end 20 of a tab to the connecting neck portion 22 where the tab is joined to the strip proper. This neck forms an area for bending the tab as will be explained more fully later. It may be secured to the body of the spacer thereadjacent near the free end 20 by means of a narrow neck of metal 23 to hold the tab in position and prevent distortion in handling and prior to use. The neck is bent and broken by the installation man's slight bending thereof back and forth.

One end of the strip 10 may be somewhat laterally restricted to form a blunt terminus 24, if desired, adjacent which a semicircular band 26 is cut therein and connected only to the strip 10 along the lines 28, 30 which thus form lines of bending so that the arcuate strip 26 may be raised up to form an eyelet.

The opposite end of the spacer is laterally restricted to a width corresponding to the maximum span of the eyelet 26 so as to form an elongated tongue 32 adapted to be received therethru. The opposite longitudinal sides of the tongue, or at least one side thereof, are formed with cross-aligned notches 34. These are characterized by one approximately perpendicular edge and an opposite edge of lesser slope. The more abrupt edge 36 is disposed along each notch approximate to the spacer proper. Accordingly, when the spacer is bent upon itself and the tongue inserted in the eyelet, subsequent movement of the tongue in the opposite direction will cause the abrupt edges of the notches to engage the edges of the cross bow 26 of the eyelet.

The action of the ratchet lock is further enhanced by a concave bowing of the tongue so as to be curved opposite the arc of the eyelet, as seen particularly in Figure 6. In this manner a tighter or more permanent engagement between the notches and the eyelet is effected. At the same time, due to the resilience of the metal of the tongue, the latter can be inserted as far as desired through the eyelet, with ease, since sliding contact between the less abrupt edges 38 of the tongue and the edge of the eyelet causes the tongue to flatten out if necessary to pass under the bow of the eyelet. The resilience of the metal will then cause the tongue to arc back to its original shape at the position of locking. Removal is best facilitated if desired by sidewise movement of the tongue to release the same one tooth at a time first on one side then on the other.

Spaced longitudinally along the strip are a series of oval-ended extensions 40, the free ends 42 of which are disposed adjacent each other, while their opposite connected ends 44 delineate lines of bending and constitute the attachment of the extensions to the strip proper. At the same time that an extension is stamped out of the metal, a longitudinal rib 46 is centrally formed therealong (Figures 4 and 5). This indentation, however, does not extend all the way to the tip 42 so that the flat end may be bent transversely to the body of the extension to form a footing member for abutment with the periphery of a conduit or structure 48 around which the spacer is wrapped. In this connection it is importnt to observe that the alternate facing or alignment of successive extensions (regardless of the direction the footing member is bent) allows the wound strip to be moved both clockwise and counter-clockwise in fastening the same to the enclosed tubing, without such movement causing the whole series of extensions to collapse in the direction of their bending. In other words, the alternate bending of successive members of the series strengthens the unit in regard to its circular adjustment.

Means for delineating the longitudinal strip into segments 50 which it will assume upon bending, as well as for reinforcing the same are also provided. Crosswise between the butt ends of successive extensions 40, there are ventilating parallel slits 51 defining therebetween a transverse weakened area 53 simultaneously stamped in the metal upon formation of the spacer to ease the bending and forming of the spacer around the conduit at the side areas 53 thus formed. At the same time an opposing pair of dimples or openings 54 is formed between the free ends of the extensions so as to indicate therebetween both a line of bending 53' and to delineate segments. At the same time they serve to reinforce or strengthen the bent strip. In addition, parallel or lateral reinforcing ribs 56 may be formed in the strip at the same time, thus further strengthening the rigidity of the segmented portions of the bent spacer.

The attachment tabs 16 and 16a which may be one or any larger number can, if desired, be provided with nail holes or screw sockets formed therein. However, nails 58 can generally be readily driven through the same so as to attach the tab to a structural member 60 of a wall or partition along which the conduit 48 is to be disposed. In this connection it is important to note that attachment may be made to a stud 60 regardless of whether it is disposed parallel or crosswise to the supported pipe because of the nearly universal bending or twisting of the tab or as allowed by the neck 22. As noted earlier, this flexibility of attachment is dependent in part on the fact that the spacer is generally not designed to hang or support the entire weight of the conduit, which is supported by itself. Rather, the spacer is designed to center or align the already supported pipe in relation to possibly combustible materials through an opening in which the tubing is adapted to pass. The outer face of the mounted strip 10 may or may not contact such material but in either event the extensions 40 provide a ventilating space between such material and the pipe 48. Accordingly, successive spacers may be nailed to non-parallel studs in a flooring, roof or wall. Further, two or more attachment tabs of the same spacer may be angularly disposed in respect to one another and thus attached to different construction members 60. This is exemplified in Figure 2 wherein one tab 16a is bent down to lie in a horizontal plane for securement to a horizontal joist or the like member 62, bending being optionally accomplished in the neck 22.

Accordingly, it will be seen that I have provided a vent spacer that can be stamped out of sheet metal in one operation and stored or shipped flat so as to occupy little space. Deformable sheets of iron or aluminum are particularly preferred materials, the latter because of its non-rusting properties. However, other sheet material can be used such as copper, tin, or various alloys if expense justifies it. The total time required for a workman to bend out the extensions 40, wrap the strip around a conduit, and insert the ratchet tongue 32 through the locking eyelet 26 is very brief. The spacer can then be slid lengthwise along the conduit if necessary, to arrive at the final location, and the tab or tabs 16 quickly fastened to a beam in the ceiling or wall. It will be seen especially that the time hitherto spent in forming an individual spacer for a particular opening is wholly saved and in comparison a thoroughly satisfactory spacer is provided by my method at a comparatively small cost.

This invention features a preferably one-piece sheet metal spacer which incorporates a novel and improved ratchet lock which is easily and quickly installable, readily bendable to conform to the size and shape of the pipe whether round, square, oval or what not, which is installable with facility after the pipe is up, which requires no pre-forming for installation, which protects from fire hazards due to its inherent ventilated design which is instantly adjustable to variations in pipe size, thus saves space in stock and in transport, and whose said one-piece construction is both safe and exact.

The entire spacer is formable in a single die stamping operation. Thus the pattern is formable as shown in outline in Figure 1 in one step, but preferably the entire finished product is completed, including the lateral forming and bending of the preferred L-shaped extensions 40 in the same operation. Such extensions are formed with their free ends facing one another in pairs and are further tilted towards one another, or at least out of the perpendicular relative to the plane of the main body of the spacer so that when the spacers are stacked for shipment the bodies will lie flat against one another with their extensions interfitting in the manner of a stack of cones or other tapered receptacles, e. g., like ordinary water-glass tumblers.

The same simple stamping operation will also serve to cut the slots around and raise the dimples 54, cut slots forming the transversely weakened areas 53 and 53', form re-inforcing ribs 46, cut the tongue 32 while simultaneously bowing the same transversely, cut the slits 18 and connecting necks 23, and cut the arcuate band 26. Even the terminus 24 is bent in said operation, preferably at an acute or obtuse angle so that the same will telescope relative to the corresponding parts of adjacent spacers when laid flat one against another for storage or shipment, similarly to the extensions 40 as heretofore stated.

While I have herein shown and described my invention in what I have presently conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

The invention having been herein described, what I claim as new and desire to secure by Letters Patent is:

1. A spacer of the character described comprising: an elongated strip of deformable sheet metal formed with a longitudinal series of transverse extensions severed from said strip along their opposite sides and one end only, and bent outward from the strip along the other end, which extensions are additionally bent adjacent said first end at a distance from said strip beyond the deformable limits of the strip-secured metal to provide footing portions collectively adapted to abut against the perimeter of a structure around which the strip may be wound so as to space the same apart therefrom, and means for fastening the wound strip to a supporting structure said strip of metal having longitudinally extending dimples stiffening said strip at the junctures of the respective extensions at their said other ends, said stiffening dimples terminating at stations spaced from said junctures and defining unstiffened transverse bend lines for the strip between said extensions.

2. A spacer of the character described comprising: an elongated strip of deformable sheet metal formed with a longitudinal series of transverse extensions severed from said strip along their opposite sides and one end only, and bent outward from the strip along the other end, collectively adapted to abut against the perimeter of a structure around which the strip may be wound so as to space the same apart therefrom, said extensions being formed parallel to the length of the strips with said one end of alternate extensions being oppositely oriented, and coupling means for fastening together the opposite ends of the strip about such structure.

3. A spacer of the character described comprising: an elongated strip of deformable sheet metal formed with a longitudinal series of transverse extensions severed from said strip along their opposite sides and one end only, and bendable outward from the strip along the other end, which extensions are additionally bendable adjacent said first end to provide footing portions collectively adapted to abut against the perimeter of a structure around which the strip may be wound so as to space the same apart therefrom, which extensions are further provided with longitudinal reinforcing ribs pressed therein to constitute said extensions rigid self-sufficient fingers, and means for fastening the wound strip to a supporting structure.

4. A spacer of the character described comprising: an elongated strip of deformable sheet metal formed with a longitudinal series of transverse extensions severed from said strip along their opposite sides and one end only, and bendable outward from the strip along the other end, which extensions are additionally bendable adjacent said first end to provide footing portions collectively adapted to abut against the perimeter of a structure around which the strip may be wound so as to space the same apart therefrom, one end of said strip being formed with a laterally restricted tongue having engaging notches along both sides thereof, the strip being formed with an outwardly bendable substantially arcuate strip free at its curved side edges from said elongated strip, and continuous at its ends with the metal of said elongated strip, defining an eyelet adjacent the other end of said elongated strip through which said tongue may be engageably received, and means for fastening the wound strip to a supporting structure said arcuate strip being bendable for use at an acute angle relative to the plane of said elongated strip to receive, bind, and hold said tongue between said elongated strip and said arcuate strip.

5. A spacer of the character described comprising: an elongated strip of deformable sheet metal formed with a longitudinal series of transverse extensions severed from said strip along their opposite sides and one end only, and bendable outward from the strip along the other end, collectively adapted to abut against the perimeter of a structure around which the strip may be wound so as to space the same apart therefrom, one end of said strip being formed with a laterally restricted tongue having engaging notches along a side thereof, the strip being formed with an outwardly bendable eyelet adjacent its other end making an acute angle therewith and through which said tongue may be engageably received, and means for fastening the wound strip to a supporting structure.

6. A spacer of the character described comprising: an elongated strip of deformable sheet metal formed with a longitudinal series of transverse extensions severed from said strip along their opposite sides and one end only, and bendable outward from the strip along the other end, collectively adapted to abut against the perimeter of a structure around which the strip may be wound so as to space the same apart therefrom, one end of said strip being formed with a laterally restricted tongue having engaging notches along a side thereof, the strip being formed with an outwardly bendable effectively arcuate eyelet adjacent its other end through which said tongue may be engageably received, said tongue being arcuately bent contrary to the curvature of the eyelet, and means for fastening the wound strip to a supporting structure.

7. A spacer of the character described comprising: an elongated strip of deformable sheet metal formed with a longitudinal series of transverse extensions severed from said strip along their opposite sides and one end only, and bendable outward from the strip along the other end and thus collectively adapted to abut against the perimeter of a structure around which the strip may be wound so as to space the same apart therefrom, one end of said strip being formed with a laterally restricted tongue having engaging notches along the sides thereof, the strip being formed with an outwardly bendable essentially arcuate eyelet adjacent its other end through which said tongue may be engageably received, said tongue being arcuately bent contrary to the curvature of the eyelet, and at least one elongate attachment tab formed alongside said strip and connected at one end to a lateral edge of the strip adjacent a line of bending of the tab.

8. A spacer of the character described comprising: an elongated strip of deformable sheet metal formed with a longitudinal series of transverse extensions severed from said strip along their opposite sides and one end only, and bendable outward from the strip along the other end, and thus collectively adapted to abut against the perimeter of a structure around which the strip may be wound so as to space the same apart therefrom, said strip being formed with transverse lines of weakness between and spaced from respective successive extensions so as to be bendable thereacross to define approximately equal segments of the strip length said segments having longitudinal beads for stiffening thereof, one end of said strip being formed with a laterally restricted tongue having engaging notches along the sides thereof, the strip being formed with an outwardly bendable eyelet adjacent its other end through which said tongue may be engageably received, said tongue being arcuately bent contrary to the curvature of the eyelet, and at least one attachment tab formed parallel to said strip and connected at one end to a lateral edge of the strip adjacent a line of bending of the tab.

9. A spacer of the character described comprising: an elongated strip of deformable sheet metal formed with a longitudinal series of transverse extensions severed from said strip along their opposite sides and one end only, and bent outward from the strip along the other end, which extensions are additionally bent adjacent said first end to provide footing portions collectively adapted to abut against the perimeter of a structure around which the strip may be wound so as to space the same apart therefrom, which extensions are further provided with longitudinal reinforcing ribs pressed therein, said strip being formed with transverse lines of weakness between successive extensions and longitudinal stiffening beads between said transverse lines of weakness so as to be bendable thereacross to define stiff approximately equal segments of the strip length respectively corresponding to the extensions, said extensions being approximately centered between respective adjacent lines of weakness, one end of said strip being formed with a laterally restricted tongue having engaging notches along the sides thereof, the strip being formed with an outwardly bendable eyelet adjacent its other end through which said tongue may be engageably received, said tongue being arcuately bent contrary to the curvature of the eyelet, and at least one attachment tab formed parallel to said strip and connected at one end to a lateral edge of the strip adjacent a line of bending of the tab.

10. A spacer as defined in claim 4, wherein said tongue is bent arcuately along its longitudinal axis in a contrary direction to the curvature of the eyelet.

11. A spacer as defined in claim 9, and including a releasable connection securing said tab to said lateral edge of the strip adjacent the other end of the strip.

12. A spacer as defined in claim 7, said other end of said elongated strip extending beyond the eyelet and being bendable laterally in a manner corresponding to said transverse extensions, thereby providing a manipulatable handle for tightening said spacer and said tongue through said eyelet, said last mentioned end conforming in length to said transverse extensions.

SAUL EPSTEIN.

References Cited in the file of this patent

UNITED STATES PATENTS

| Number | Name | Date |
| --- | --- | --- |
| 390,003 | Converse | Sept. 25, 1888 |
| 501,392 | Wiedenmann | July 11, 1893 |
| 1,676,485 | Finucane | July 10, 1928 |